United States Patent [19]

Taylor

[11] Patent Number: 4,538,181

[45] Date of Patent: Aug. 27, 1985

[54] OPTICAL SCANNER

[75] Inventor: William H. Taylor, South Deerfield, Mass.

[73] Assignee: Kollmorgen Technologies, Dallas, Tex.

[21] Appl. No.: 597,645

[22] Filed: Apr. 6, 1984

Related U.S. Application Data

[63] Continuation-in-part of Ser. No. 470,499, Feb. 28, 1983.

[51] Int. Cl.³ .............................................. H04N 3/08
[52] U.S. Cl. .................................... 358/208; 358/285; 358/199; 358/206; 250/236; 350/6.5; 350/6.6
[58] Field of Search ............... 358/208, 206, 199, 285, 358/293, 205; 350/6.5, 6.9, 3.71; 250/236

[56] References Cited

U.S. PATENT DOCUMENTS

| | | | |
|---|---|---|---|
| 2,960,001 | 11/1960 | Dauguet | 350/6.5 X |
| 3,448,458 | 6/1969 | Carlson et al. | 358/208 X |
| 3,520,586 | 7/1970 | Bousky | 358/206 X |
| 3,806,222 | 4/1974 | Knappe | 358/206 X |
| 4,304,459 | 12/1981 | Kramer | 350/3.71 |
| 4,429,220 | 1/1984 | Noguchi | 250/236 |

*Primary Examiner*—Howard W. Britton
*Assistant Examiner*—Victor R. Kostak
*Attorney, Agent, or Firm*—Morgan, Finnegan, Pine, Foley & Lee

[57] ABSTRACT

An optical scanner for orthogonal scanning in read and/or write modes has a framing mirror (20) for linear vertical scanning and a rotating disc (30) with a circular array of concave reflectors (32) for horizontal scanning. Primary imagers (24, 164) focus the linear vertical scan onto a strip mirror (26) which reflects the scanned pixels to the concave reflectors. Preferably, the concave reflectors reflect the pixel image in a collimated beam which is focused by a collection optic (38, 200) onto radiation detector (40). Image rotator (221), collection aperture defining device (270, 272), aperture shading device (290), and a device for suppressing spurious radiation are also provided.

60 Claims, 30 Drawing Figures

OPTICAL SCANNER

This is a continuation-in-part application of United States patent application Ser. No. 470,499, filed Feb. 28, 1983. This invention relates to optical scanners, and more particularly, to compact optical scanners capable of scanning a field of view at high scanning rates suitable for forming a video display.

BACKGROUND OF THE INVENTION

Optical scanning systems find use in a variety of applications such as thermal imaging systems known as FLIR's (Forward Looking Infra Red systems). In such systems thermal radiation, for example, in the infrared range, is typically collected by a lens and the image is raster scanned in the vertical and horizontal directions. The radiation from each picture element in succession is focussed onto a radiation detector which provides an electrical signal according to the detected radiation intensity. The electric signal from the detector can then be used to create a television-like video display corresponding to the original thermal image.

Although the invention herein will be described principally in connection with thermal imaging systems, the invention is not limited thereto. In particular, it should be noted that the invention is also operable with respect to other types of radiation such as light in the visible spectrum. Furthermore, although the principal description of the system will be in the "read" mode, the system is also capable of operating in the reverse direction to paint or "write" an image starting from a variable intensity control signal.

In the past optical scanning has been achieved in a variety of different ways usually employing moving mirrors to provide the horizontal and vertical scanning. In its simplest form, two separate oscillating mirrors are employed, one rotating about an axis so as to provide the horizontal scan and the other rotating about an axis so as to provide a vertical scan. The oscillating motions of the mirrors rotate the mirror in one direction to provide the scan followed by a rapid "flyback" rotation to position the mirror at the beginning of the next scan. The oscillating motion of the high speed horizontal scanning mirror imposes severe limitations on the operable scanning speed with this arrangement. This approach also suffers from scanning distortions of the image and electronic signal processing difficulties.

A common approach utilized to improve the scanning speed is to replace the high speed horizontal oscillating mirror with a multi-faceted rotating polygonal mirror. With this arrangement successive facets of the polygonal mirror sweep the image to provide the horizontal scans. The facets can either be on the outside of a solid polygon (see for example, U.S. Pat. Nos. 4,210,810, 4,180,307 and 4,156,142) or on the inside of a cylinder (see for example, U.S. Pat. No. 3,604,932). Since the high speed horizontal scanning mirror motion is rotary rather than oscillating, higher scanning rates are possible.

However, in order to operate such polygonal mirrored systems at television raster scanning rates (15,750 Hertz or 63.5 microseconds per line) the rotating speed for the polygonal mirror is typically in the range of 40,000 to 80,000 rpm. Such high operating speeds result in critical motor design problems, particularly in handling the high frequency motor energizing signals, in precisely balancing the rotating apparatus, and in achieving reasonable bearing lift. Normally, in such high speed systems the rotating polygon mirror structure must be placed in an evacuated chamber to reduce air resistance, hence, adding considerably to the cost and operating difficulties of the system.

The number of facets in a polygon mirrored system is determined, generally, by the desired scanning rate and the available motor speed. The mirror surfaces must be large enough to accommodate the optical pupil diameter at the entrance to the system and, hence, the mirror structure cannot be artitrarily small. The mirror surface is preferably large enough to avoid serious vignetting whereby part of the incoming image misses the mirror at positions toward the ends of the horizontal scan lines. In a system designed to achieve quality imaging the rotating mirror structure is of a considerable size imposing considerable load on the drive motor system.

Another problem encountered with polygon mirrored systems is their poor scanning efficiency. In a scanning system it is desired to devote maximum time to scanning the image with a minimum amount of lost time between successive scans. In a polygon mirrored system the scanning efficiency is relatively low, for example, on the order of 25 percent for a six sided polygon scanning a 30 degree field of view.

A further problem with polygon mirrored systems arises when used in combination with telescopes. Normally there is insufficient distance between the telescope pupil at the entrance to the system and the first element of the imaging lens in which to accommodate the horizontal and vertical scanning mirrors. In order to increase the available space for the mirrors it becomes necessary to add relay or transfer optics to the system. These undesirably add size, weight and cost to the system.

Although rotating polygon mirrored systems as discussed above are the most common of the prior optical scanning systems, two further approaches should be mentioned. One such other approach utilizes a star shaped mirror wheel which is shaped like a gear wheel whereon the scanning mirrors are located on the sides of the gear teeth. For example, see the IR Handbook, by ONR Department of Navy, Library of Congress NO. 77-90786 page 10-23. This approach tends to reduce the required rotating speed for scanning horizontal traces and eliminates some of the optical problems but, on the other hand, suffers from degraded imagery due to focus shifts inherent in the operation and due to difficulties in maintaining the required surface tolerances for the star wheel configuration.

Another known approach is to use a linear array of detectors capable of sensing radiation intensity along the entire horizontal trace thereby eliminating the need for one of the scanning mirrors. The horizontal detector arrays however, are too expensive for most applications and usually result in undesirable configurations for the scanner unit.

Summary of the Invention

In a typical scanning system according to the invention scanning is carried out in the normal orthogonal raster scanning pattern. The scene being scanned is covered in a succession of horizontal traces moving gradually from the top to the bottom of the scene.

The high speed horizontal scanning is achieved using a circular array of concave reflectors on a rotating scanning disc which operates in conjunction with a strip mirror. The horizontal trace being scanned appears on the strip mirror. In a preferred embodiment of the invention the strip mirror is separated from the concave reflectors by a distance corresponding to the reflector focal length. As the scanning disc rotates, successive concave reflectors scan the strip mirror image and thereby scan successive horizontal traces. The radiation from the reflectors is focused onto a suitable detector which then provides an electrical signal corresponding to the detected radiation intensity. The radiation emerging from the concave reflectors is in the form of a collimated beam which is focused onto the detector by a collection optic. The high speed horizontal scanning according to the invention is conveniently combined with a vertical scanning arrangement such as can be achieved using a moving framing mirror to provide a complete scanning system.

Since the disc scanning system according to the invention differs considerably in concept with respect to prior polygon scanners, it is difficult to make a direct comparison. In general, however, the motor speed required for the high speed horizontal scanning can normally be reduced by a factor of four, i.e., from a typical speed of 40,000 RPM to a speed of 10,000 RPM. Horizontal scanning efficiency is increased from a typical value of 25 percent for polygon scanners to substantially 100 percent with the disc scanner. The weight of the rotating disc being used by the invention can be on the order of 1/10 the weight of the rotating polygon. The required size of the framing mirror for the vertical scanning and the required size for the telescope associated with the system are both smaller than would be required for a comparable system using polygon scanning. Furthermore, high speed polygon scanning systems normally require that the polygon be located in an evacuated chamber to reduce windage losses whereas with the invention there are no significant windage problems due to the disc design and the lower rotation speed required.

The scanning system according to the invention can be used to "read or write" and, furthermore, can do both simultaneously using the same framing mirror and array of concave reflectors. Simultaneous read/write systems are useful for image intensification such as utilized in night scopes for example, or to achieve radiation transformations such as required for converting infrared imaging into a visible light display.

BRIEF DESCRIPTION OF THE DRAWINGS

The manner in which the invention is achieved can be better understood with reference to the drawings which form part of this specification and in which.

DETAILED DESCRIPTION OF THE INVENTION

Figure 1:
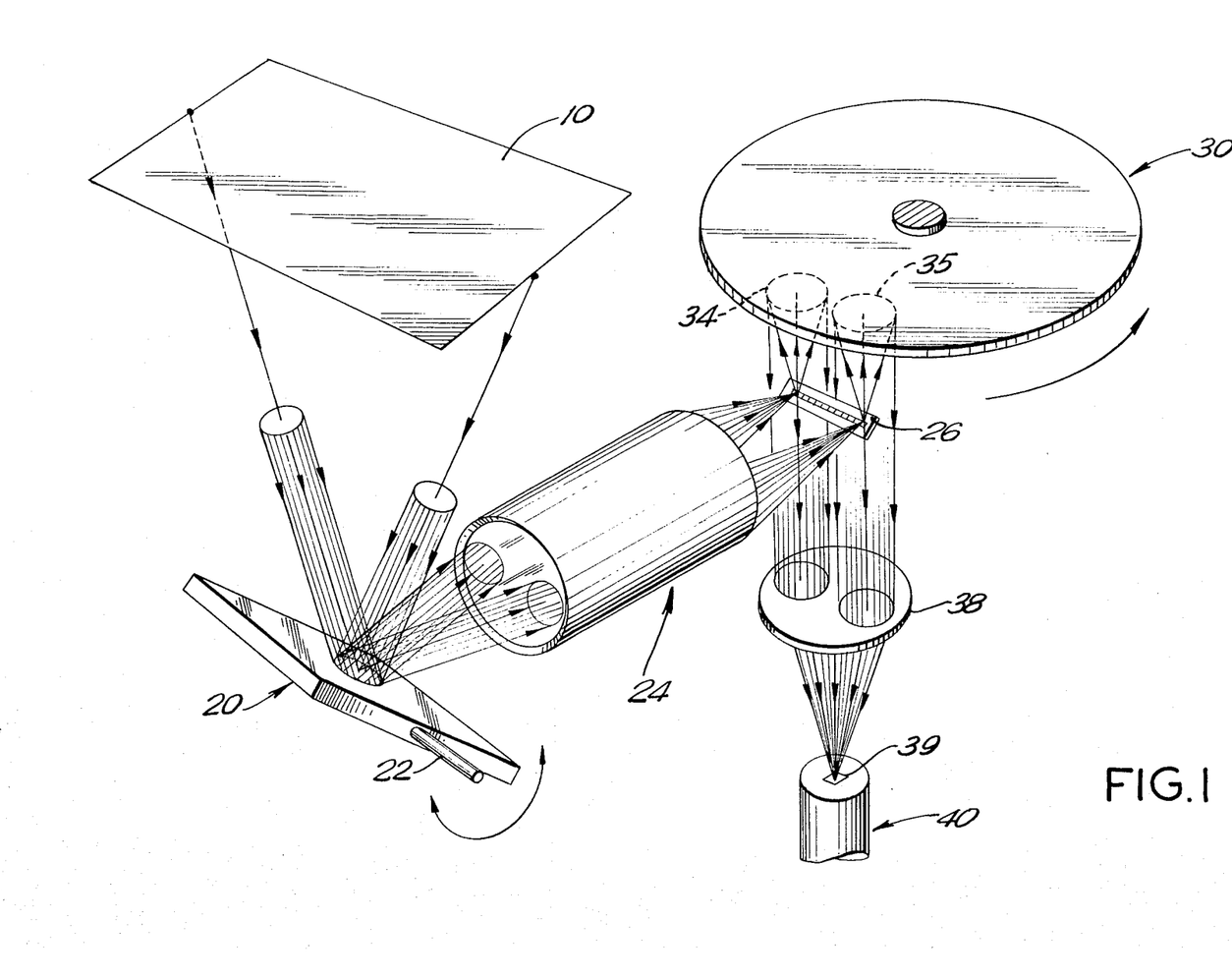
FIG. 1 is a perspective view of the scanning apparatus showing the optical paths during scanning.
Figures 2A, 3:
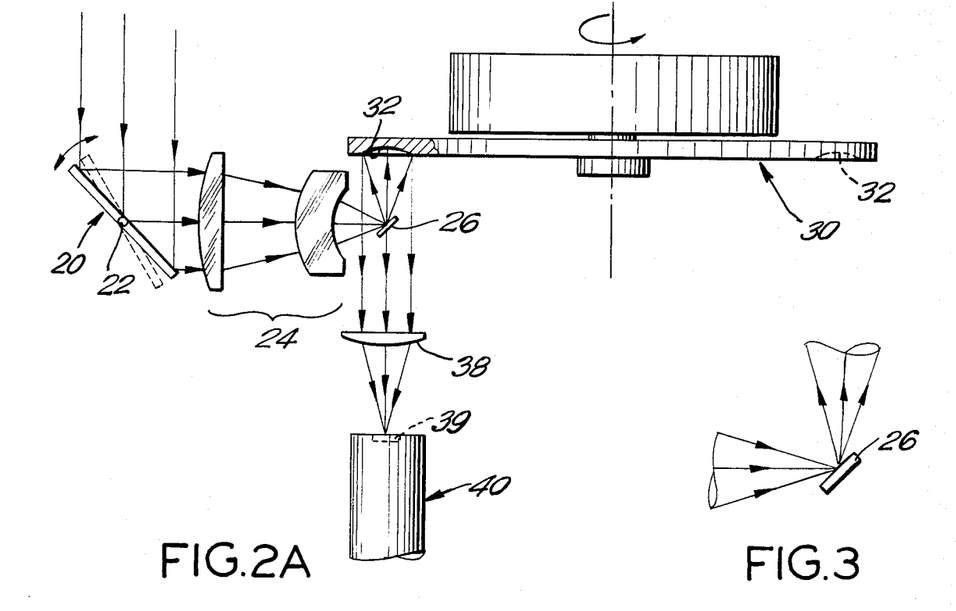
FIGS. 2A and 2B are elevation and plan views respectively, of the apparatus shown in FIG. 1.
FIGS. 3 and 4 are cross-sectional views illustrating two different strip mirror constructions.
Figure 2B:
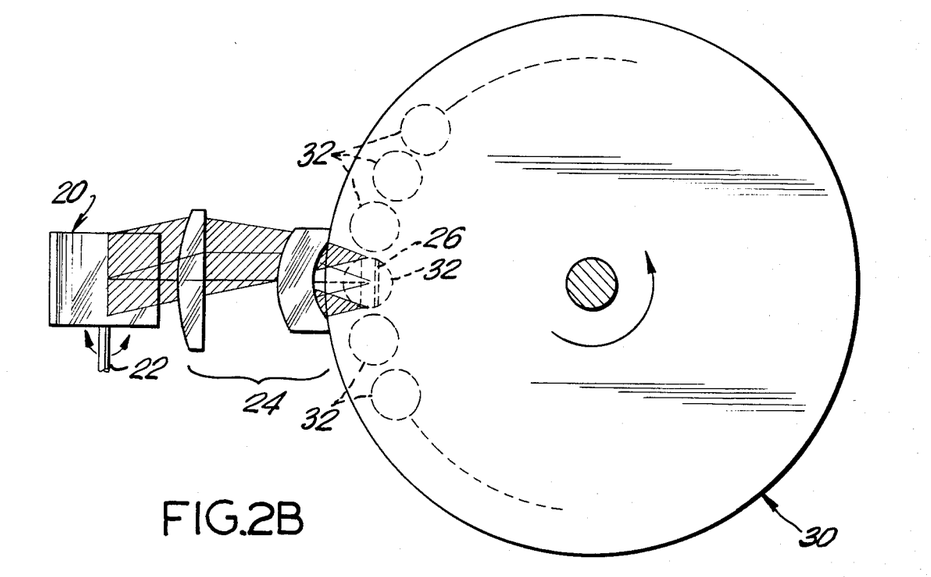
Figure 4:
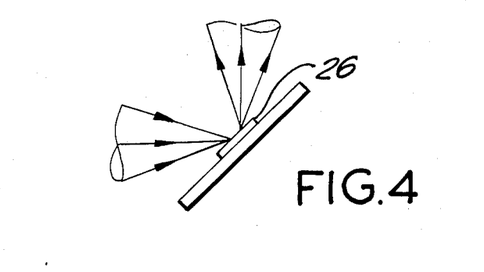

The basic system according to the invention is illustrated in FIGS. 1, 2A and 2B. Scene 10 is scanned vertically by an oscillating low speed framing mirror 20 and is scanned horizontally by moving concave reflectors on a high speed rotating scanning disc 30. The scanned radiation from the scene is focused on a detector 40 which provides an electrical signal corresponding to the intensity of the detected radiation. The system thus scans the scene and provides an electrical signal suitable for controlling beam intensity in a television like video display.

Framing mirror 20 is a planar polished mirror mounted for rotation about an axis as shown in FIG. 1. Initially the framing mirror reflects light or radiation from the top of scene 10 and then, as the mirror rotates, moves down the scene to reflect light from increasingly lower positions of the scene. When the bottom of the scene is reached the mirror is returned to the initial position at the top as quickly as possible. The movement of the framing mirror is in the nature of a repetitive saw tooth vertical scan, i.e., moving gradually from top to bottom followed by a short "flyback" interval. A variety of known techniques can be utilized for achieving the desired oscillatory motion of the mirror as, for example, a galvanometer type action wherein the mirror is moved by an electromagnetic attraction against a spring return pull. The repetition rate for the mirror movement is in accordance with the desired vertical scanning rate of the system. A repetition rate of 60 scans per second would be typical for an interlaced raster scan at standard television rates.

Radiation from framing mirror 20 passes through an imaging lens 24 which focusses the radiation onto a thin strip mirror 26. The imaging lens is telecentric, i.e., different pencils of rays emerging from the lens are substantially parallel regardless of location. Furthermore, the lens must have an entrance pupil in front of the lens at the location of the framing mirror and must focus the radiation onto strip mirror 26 located beyond the lens.

Figures 5, 5A:
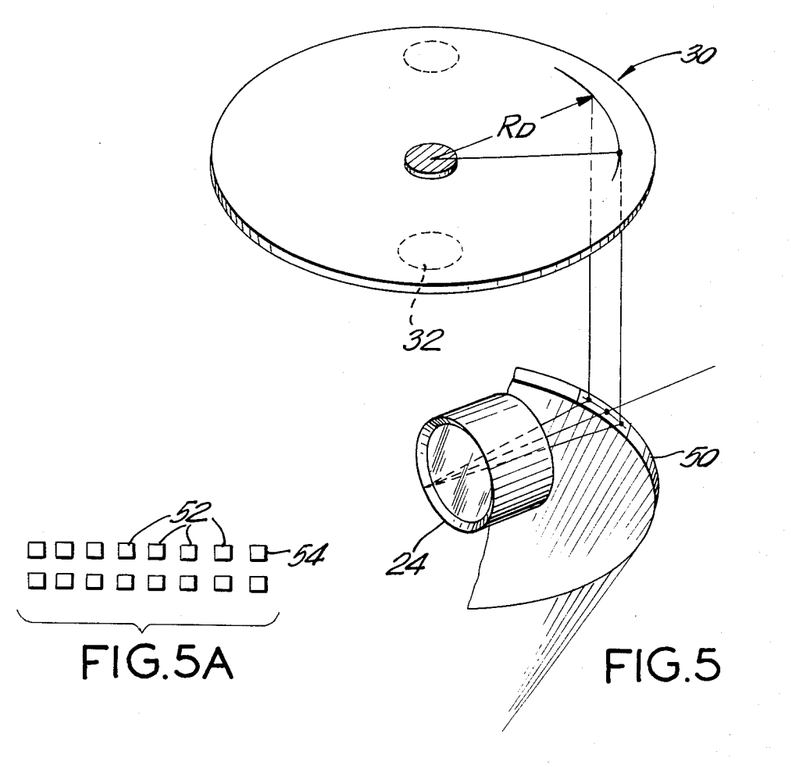
FIG. 5 is a perspective illustration of an embodiment including a curved strip mirror.
FIG. 5A is a view of a multiple detector array for use in the invention.

Strip mirror 26 is stationary and is slanted to reflect radiation toward the concave reflectors of scanning disc 30. The strip mirror includes a polished thin strip reflective surface which can be achieved using a polished reflective bar or taut ribbon as illustrated in FIG. 3 or by vacuum depositing a reflective metallic strip on to a transparent substrate as shown in FIG. 5. The width (the small dimension) of the ribbon determines the maximum width of the area scanned during a horizontal trace and should be selected accordingly. A typical width for the strip mirror would be about 0.5 mm.

Scanning disc 30 is constructed including a circular array of concave reflectors 32 formed as indentations into one side of the disc. The concave reflectors are located at a common radius of the disc in line with the strip mirror as shown in FIG. 2A. Radiation is reflected upwardly from strip mirror 26 into one of the concave reflectors 32 and then downwardly past the strip mirror in a collimated beam. The concave reflectors are preferably formed using a single point diamond turning technique known in the optical manufacturing industry. In low cost systems, however, the disc including the concave reflectors can be formed by stamping or molding. The concave reflectors are dimensioned to have a focal length corresponding to the distance between scanning disc 30 and strip mirror 26. The ideal concave configuration is parabolic, although a spherical configuration may be preferred under certain conditions.

The collimated beam emerging from the concave reflectors passes through a collector lens 38 which focusses the beam onto detector 40 through a field stop opening 39. The aperture of the collector lens must be sufficiently large to accommodate the radiation beams from the scanning disc at all operable reflector positions. The lens is designed to focus all such radiation beams through stop 39 onto the radiation detector. The lens should be substantially free of aberrations.

The type of detector used depends on the type of radiation being detected and may, for example, be a photoelectric detector if the system operates in the visible spectrum or an infrared detector if the system operates in the thermal radiation spectrum. If the system operates in the infrared range, the detector is preferably cooled by means of a Dewar flask to reduce ambient thermal noise. Ultraviolet detectors can also be used. Furthermore, the system can be multispectral wherein detectors of different types can be used to simultaneously detect different types of radiation.

The illustration in FIG. 1 shows the beam path for two different reflector positions 34 and 35. Framing mirror 20 is shown in a position corresponding to the vertical center of the scene being scanned and hence, rotation of disc 30 provides a horizontal scan across the center of the scene. When a reflector is in position 34 toward the left, the radiation from the left hand side of scene 10 is reflected off framing mirror 20 through imaging lens 24 to the left end of strip mirror 26 as viewed in FIG. 1. The radiation is then reflected upwardly by the strip mirror to the concave reflector at position 34 and then downwardly in a collimated beam past the strip mirror, through collector lens 38 to detector 40.

As disc 30 rotates in the counterclockwise direction, as indicated by the arrow in FIG. 1, the concave reflector moves toward the right and picks up radiation from points increasingly toward the right of the strip mirror. Eventually rotation of disc 30 brings the concave reflector to position 35. Repetitive horizontal scans achieved by movement of the concave reflectors in combination with the movement of the framing mirror provides a raster type scan of the entire scene.

The number of reflectors, the disc diameter and the speed of rotation are parameters which are selected in accordance with the desired horizontal scanning speed. Horizontal scanning at standard television rates (assuming two interlaced fields per frame and two rows of detectors) can be achieved using 24 reflectors located on a diameter of 72 mm rotating at 19,700 Rpm.

With optical imaging systems and, more particularly thermal imaging systems, detection of spurious radiation is undesirable. Spurious radiation is radiation which does not originate from the image being scanned but which nonetheless reaches the detector.

Figures 17, 18B:
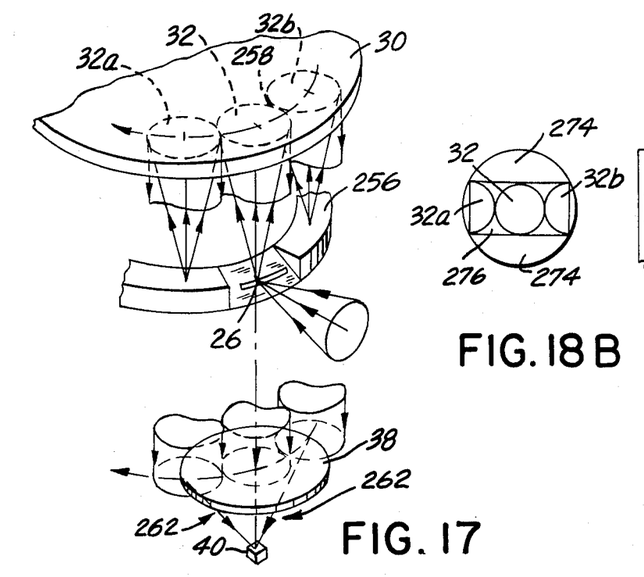
FIG. 17 is a partial perspective view of an alternative embodiment of the scanning apparatus showing optical paths during scanning.
FIG. 18B is a plan view of the system collection aperture.
Figure 19:
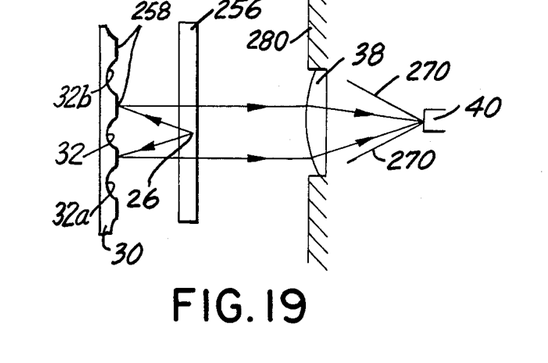
FIG. 19 is a partial elevation view of an alternative embodiment of the scanning apparatus.

Referring to FIGS. 17 and 19 (wherein reference numerals are used corresponding to FIGS. 1 and 2), spurious radiation may reach detector 40 if emitted from bodies within the field of view of the detector or reflected to the detector via the collector lens 38 by such surfaces as the strip mirror support 256, neighboring reflectors 32a and 32b, surface 258 of scanning disc 30 between adjacent concave reflectors, and collection lens housing 280. In thermal imaging systems a cold shield 270 is commonly positioned around detector 40 (See FIG. 19) to reduce the field of view of the detector to include only radiation reaching the detector via the collection optic. The cold shield is cooled to the temperature of the Dewar flask associated with the detector and, hence, does not emit any significant radiation.

Figure 18A:
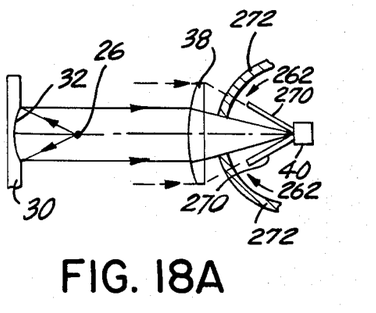
FIG. 18A is a partial elevation view of an alternative embodiment of the scanning apparatus illustrating part of the system baffling.

In the imaging system a pixel of the scanned image is focussed on the detector at any given moment via the collection lens. The cold shield conforms to the collection aperture and, therefore, excludes radiation other than that passing through the collection lens. In the present system, the scanned pixel image travels across only a portion of collection lens 38. Therefore, the collection aperture of the present system may be further restricted by reducing the field of view of detector 40 with additional shielding. Referring to FIGS. 18A and 18B, collection aperture 276 is defined by cold shield 270 and spherical baffle mirror 272. The spherical baffle mirror is dimensioned such that the shape of collection aperture 276 is rectangular and corresponds to the arc swept by concave reflector 32 across collection lens 38. Consideration of FIGS. 17, 18A and 18B shows that the combined shielding provided by cold shield 270 and spherical baffle mirror 272 prevents radiation originating within the field of view of detector 40 but outside collection aperture 276 from reaching the detector directly. Therefore, the only spurious radiation which may reach detector 40 must be emitted from a body within the view of the collection aperture.

Figure 20:
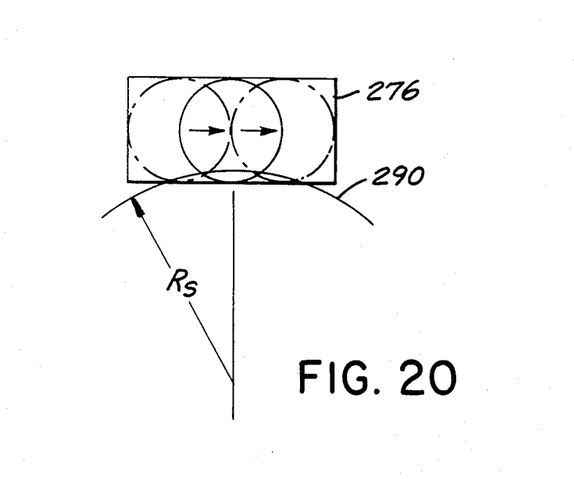
FIG. 20 is a plan view of the collection aperture illustrating shading.

Another source of distortion in optical imaging systems is variation in the brightness of the display image as a scene of uniform radiance is scanned. The most common sources of this problem, vignetting of the optical pupil and variation in optical transmission, are generally not present in the scanning system according to the present invention. Vignetting is caused by loss of the optical rays during the scan, which does not occur with the present system. In addition, the high quality optics of the present system make variations in optical transmission unlikely. This is particularly true of those embodiments with reflective optics which do not involve changes in mediums of transmission. The only remaining brightness variation comes from the non-uniform detection of image rays caused by the changing angle of incidence of the image rays upon detector 40 corresponding to the continuum of scan positions. (See FIGS. 17 and 19). The brightness variation due to this angular change across the field of view can be tolerated for most applications. For precision applications, however, this variation in brightness may be compensated for by appropriate "shading" as shown in FIG. 20. Collection aperture 276 is partially obscured by shading screen 290, shown to be circular. $R_S$ is empirically determined so that the radiation incident upon detector 40 is reduced at points of peak image brightness to a uniform level across the entire collection aperture, thereby achieving constant image brightness for all scan positions. The contour of shading screen 290 is selected for the particular application and may, in some instances, be other than circular.

Figure 9:
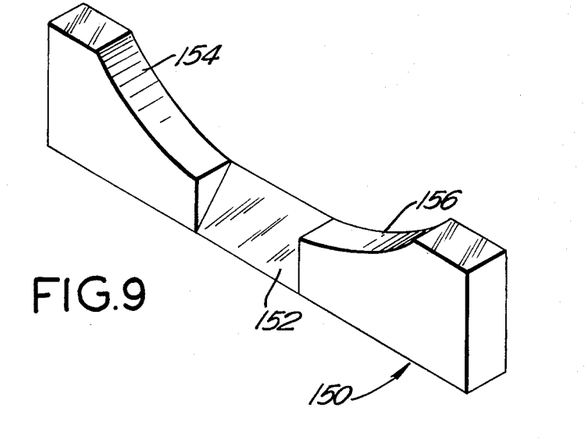
FIG. 9 is a perspective view of an alternative embodiment of a strip mirror and support structure.

Part of the spurious radiation reflected to the system collection aperture can be eliminated by a strip mirror arrangement shown in FIG. 9. A support structure 150 is shaped to provide a flat inclined surface 152 which provides the strip mirror. Outwardly of the strip mirror are curved reflective surfaces 154 and 156. The curved surfaces are so shaped that when the concave reflectors are at positions either side of the strip mirror the detector will see a portion of the cooled Dewar of the detector structure rather than the interior of the scanner. The cooled surface, normally at 77° Kelvin, emits very little thermal radiation and, hence, very little stray radiation is picked up. Surfaces 152, 154 and 156 of the mirror support are polished and receive a reflective coating.

In FIG. 9 suppression of spurious radiation is achieved by coating a potential source of such radiation with a highly reflective coating. The reflective coating is oriented so that the detector, in effect, sees itself and therefore views a cold surface which does not emit any significant thermal radiation. A reflective surface does not act as a source of thermal radiation and, therefore, proper orientation of the reflective surfaces causes that surface, in effect, to disappear.

Another arrangement of using reflective surfaces to eliminate sources of spurious radiation is shown in FIGS. 17 and 19A–C. The support 256 for strip mirror 26 lies in a plane perpendicular to the optical axis of collection lens 38. Both flat surfaces of the mirror suppot are coated with a highly reflective material. The flat surface of disc 30 on the side toward the collection lens is also coated with a reflective material so as to provide a reflective area in the region between adjacent concave reflectors. The collection lens housing 280, which suppots collection lens 38, also is coated with reflective material on the surface facing toward scanning disc 30.

Figure 19A:
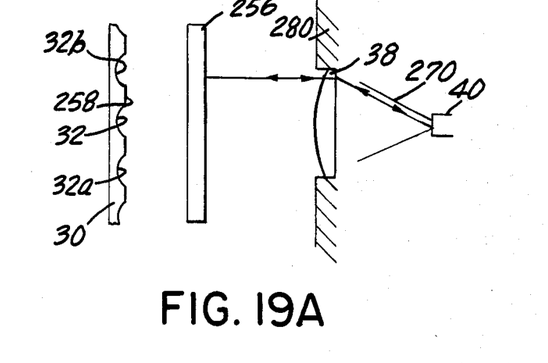
FIG. 19A-C are partial elevation views of the alternative embodiment of the scanning apparatus shown in FIG. 19 illustrating suppression of spurious radiation by showing various optical paths.
Figure 19B:
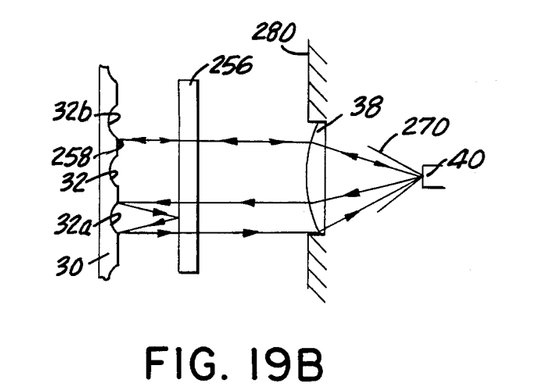
Figure 19C:
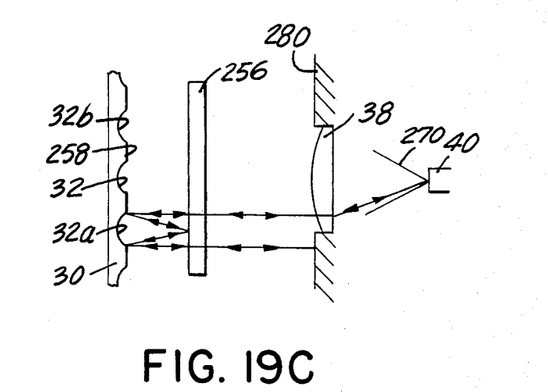

The manner in which the various reflective surfaces eliminate spurious radiation is illustrated separately in FIGS. 19A–C. FIG. 19A illustrates the reflective path from the detector side of the mirror support such that the detector, in effect, sees itself in the reflection from the near side of the support. FIG. 19B similarly illustrates how the scanning disc side of the mirror support causes the detector to, in effect, view itself via the flat surface of the scanning disc and a neighboring concave reflector 32a. Finally, FIG. 19C illustrates how reflections from the collection lens support via the concave reflector cause the detector to again view itself. In the two dimensional illustrations, light may appear to pass through the opaque strip mirror and strip mirror support. However, the rays shown are merely representative of all rays in the collimated light beam and the strip mirror support, in fact, only causes a stripe-like shadow in that beam.

With the linear strip mirror the fact that the concave reflectors follow an arcuate path while scanning results in some scan distortion since the reflectors cannot be focussed on the exact center of the strip mirror from end to end. If the reflectors are aligned for correct focus at the center of the strip mirror, they will be focussed somewhat off center at the ends of the strip mirror thereby resulting in scan distortion due to curvature in the scan. Normally, the distortion from this source is on the order of 5% or less and can be tolerated without correction. In systems used for object recognition or sighting, the effects due to scan distortion would hardly be noticed.

In precision scanning systems where distortion must be minimized, the scan distortion can be eliminated by using a curved strip mirror 50 as illustrated in FIG. 5. In this embodiment the imaging lens forms its image on a spherical surface of radius equal to the line scan disc radius $R_D$. The exit pupil distance of the imaging lens is equal to the line scan disc radius $R_D$ and is located on the lens side of the image plane. Strip mirror 50 is a segment of a cone rather than a plane so that the mirror has a radius of curvature which is also equal to the line scan radius $R_D$ and has a reflecting surface slanted, typically at 45 degrees. With this arrangement the radiation passing through the imaging lens is reflected upwardly to the concave reflectors of scanning disc 30 and the reflectors maintain the centered alignment relative to the strip mirror throughout the entire traverse.

Figure 5B:
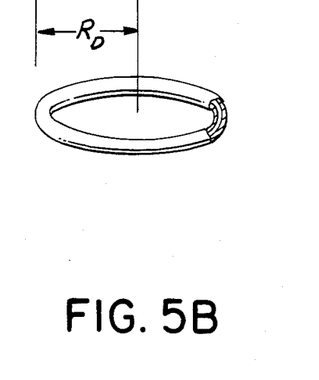
FIG. 5B is a perspective illustration of an alternative embodiment of a strip mirror as a section of a toroid.
Figure 5C:
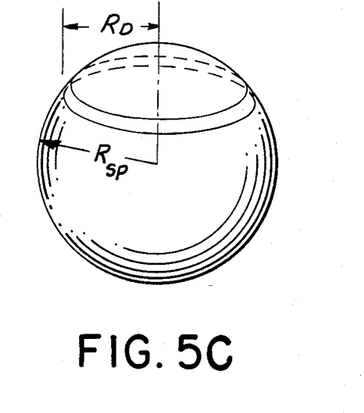
FIG. 5C is a perspective illustration of an alternative embodiment of a strip mirror as a section of a sphere.

Alternative configurations of the strip mirror can achieve the desirable traits of the conical section, that is, intercepting rays from the field of view in a similar manner to create a collimated or telecentric image reflected from the concave reflectors without vignetting during the disc scan. Generally, any toroidal mirror having one of its radii equal to the scanning disc radius $R_D$ (FIG. 5) may be used. FIG. 5B illustrates a toroidally shaped surface from which a strip mirror section may be taken. Similarly, FIG. 5C illustrates a spherically shaped surface from which a strip mirror section may be taken. Typically, the incoming image will be reflected upward to the concave reflectors from the strip mirror at a 90° angle. To obtain a strip mirror section with a radius $R_D$ taken from a spherical surface that will reflect the image at a 90° angle the radius of the sphere $R_{sp}$ should equal $\sqrt{2}\, R_d$. Depending upon the particular application various ratios of the radius of curvature of the strip mirror configuration to $R_D$ and various cross-sectional shapes of the strip mirror (i.e. circular, elliptical, etc.) may be used. For small, instantaneous fields of view, aberrations due to differences in these structures are small and relatively insignificant.

Scan distortion can also be compensated for in the electronic processing of the scanner output signal. Since the scan distortion is a function of position during the horizontal scan, compensation can be provided by suitable digital or analog techniques synchronized to the horizontal scan interval.

The imaging lens can be of the catadioptric type, that is, it can comprise both lenses and mirrors with convex or concave surfaces. Furthermore, in the preferred embodiment shown in FIGS. 10 and 11 it can simply consist of a mirror if the F/number of the imaging component is large enough to permit satisfactory image quality.

Figure 11:
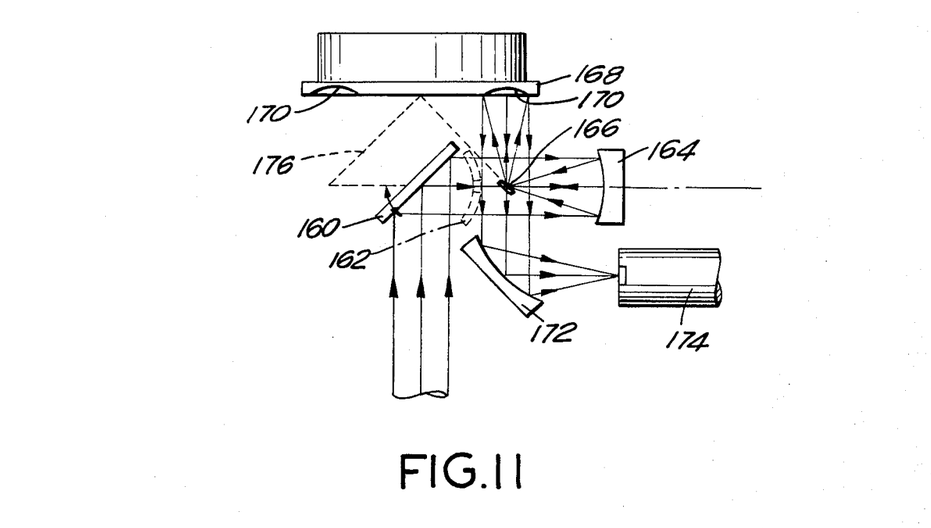
FIG. 11 is an elevation view of an alternative embodiment of the scanning apparatus with imaging and collecting reflectors.

As can best be seen in FIG. 11, with this embodiment incoming radiation is reflected off a framing mirror, through a meniscus lens 162, past a strip mirror to an imaging reflector "lens" 164. The radiation is then focussed on strip mirror 166, and reflected toward the concave reflectors 168 of rotating disc 170, from which it emerges as a collimated beam. The collimated beam passes the strip mirror and is focussed on the detector of a detector/Dewar unit 174 by means of a collector reflector 172.

Strip mirror 166 is generally of the type previously described in FIG. 5, i.e., the mirror is a section of a conical surface. In this case, however, the curved strip mirror is the exterior surface of a cone formed with a 45 degree half-angle and an axis which is coaxial with the axis of rotation for disc 170 as indicated by dotted lines 176. In this application the conical strip mirror not only eliminates scan distortion, but also causes the pencils of rays emerging from mirror 164 to be directed accurately onto the disc reflectors to thereby satisfy telecentric conditions. Imaging mirror 164 is a concave mirror with a spherical contour with a radius equal to the distance from the vertex of framing mirror 160. With this configuration the on-axis and off-axis bundles of light are reflected from the framing mirror and imaged in the same manner.

Figure 10:
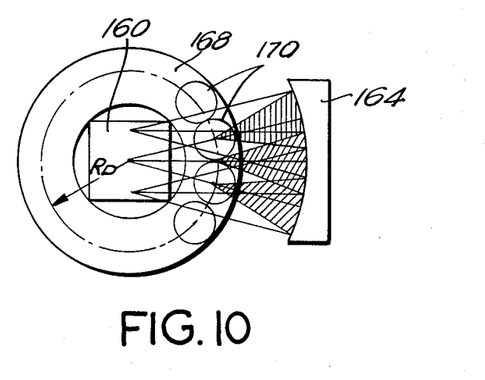
FIG. 10 is a plan view of an alternative embodiment of the scanning apparatus with a concave imaging reflector.

The reflected image off mirror 164 lies on a spherical surface which is intercepted by curved strip mirror 166. The radius of curvature of the image is one-half the radius of curvature of imaging mirror 164 and is equal to the scanning disc radius $R_D$ (FIG. 10).

An advantage of this configuration is that off-axis and chromatic aberrations are virtually non-existent. Only spherical aberrations of an on-axis type exist which are uniformly and identically present for all off-axis field points. No correction for these aberrations need be made if the F/number of the image forming pencil of rays is large enough, or if the radiation wavelength is long enough, or if resolution requirements are not demanding. Where correction is required this can easily be achieved by use of a meniscus lens 162 of concentric design with centers of curvature at the entrance pupil (vertex of framing mirror 160). Lens systems of this type are known as Bouwers-Maksutov Systems and are described by Kingslake in "Lens Design Fundamentals", Academic Press, 1978 pp 311–313. Lens 162 can be either in back of the entrance pupil (as shown in FIG. 11) or in front of the entrance pupil. One advantage in having the lens in front of the entrance pupil is that it can then also serve as a protective window at the entrance.

In the foregoing discription detector 40 has been referred to as a single point detector. In some cases, however, multiple detector arrays such as shown in FIG. 5A offer several advantages. A linear array 52 of detector elements aligned in the direction of the horizontal scan, will see the picture elements in serial fashion. If suitable time delays are introduced, the separate radiation measurements can be combined to thereby achieve a significant improvement in the signal to noise ratio. The signal to noise improvement from the time-delay and integration process is proportional to the square root of the number of detector elements in the linear array.

Multiple detectors in separate rows 54 permit parallel scanning of several different horizontal traces at the same time during a single pass of a concave reflector across the strip mirror. Two such detectors can be used to conveniently provide two interlaced fields for a raster scan frame.

With a single detector the entire optics of the scanner is operated "on-axis" for all scan positions. Multiple detector arrays cannot operate entirely "on-axis" and therefore are more affected by lens aberrations. However, depending upon performance standards there can be several detector elements in an array without seriously degrading image performance.

The use of a curved strip mirror with a multiple detector array can result in distortion caused by a "walk-off" phenomenon. This phenomenon results from optical rotation of the curved strip mirror image relative to the detector array occuring at off-axis image positions in the scanning sweep. The effect of this rotational misalignment upon a single detector element system is minimal since the only relevant parameter in such a system is the amount, not alignment, of radiation detected. In the single detector element system the amount of radiation which goes undetected due to rotational misalignment is generally insignificant since the detector element will nonetheless be activated by the radiation which is detected. For a single detector element system rotational misalignment, at worst, results in reduced sensitivity for off-axis image points. This can be corrected by either shading or intensity compensation in the electronic circuitry receiving the detector element signal. However, with a multiple detector array walk-off caused by rotational misalignment has the more detrimental effect of reducing system resolution. This reduced resolution is due to the fact that pixel radiation which simply goes undetected in the single detector element system overlaps and is detected by neighboring detector elements in the multiple detector array. Serious degradation of image quality can result as the number of detector elements is increased.

In a preferred embodiment of the invention rotational distortion is corrected using a stationary, off-axis parabolic reflector as the collection optic. The parabolic reflector is positioned to effectively focus the image at the scanning disc axis.

Figure 12:
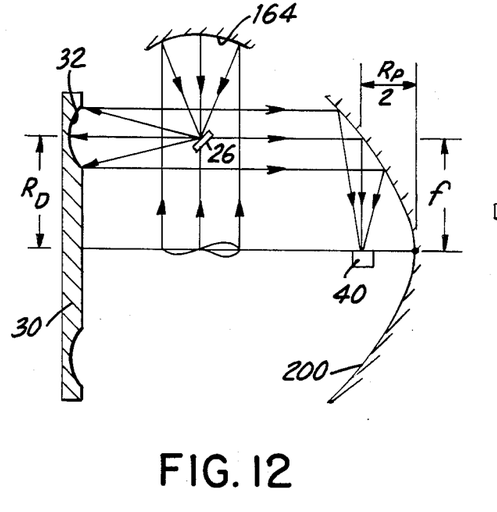
FIG. 12 is a plan view of a scanning apparatus with an off-axis parabolic reflector as collection optic.

Referring to FIG. 12, a parabolic reflector 200 is included having a base radius of curvature $R_P$ equal to the radius $R_D$ of scanning disc 30. Parabolic reflector 200 is positioned such that its operational focal length f equals twice the on-axis focal length. Linear detector array 40 is positioned on and perpendicular to the axis of parabolic reflector 200 at a distance of $\frac{1}{2} R_p$ from the base of parabolic reflector 200. With these parameters satisfied the collimated image rays from concave reflector 32 are focused in the detector array plane. The axial ray of the collimated beam is reflected from concave reflector 32 at an angle of 90° and is incident upon the detector at an angle of 90° from the scanning disc axis. Of course, fold angles other than 90° and other positional distances for parabolic reflector 200 and linear array 40 may be used, but these parameters must be selected such that the rotational distortion introduced by each is nulled rather than exaggerated by the others.

Figure 13:
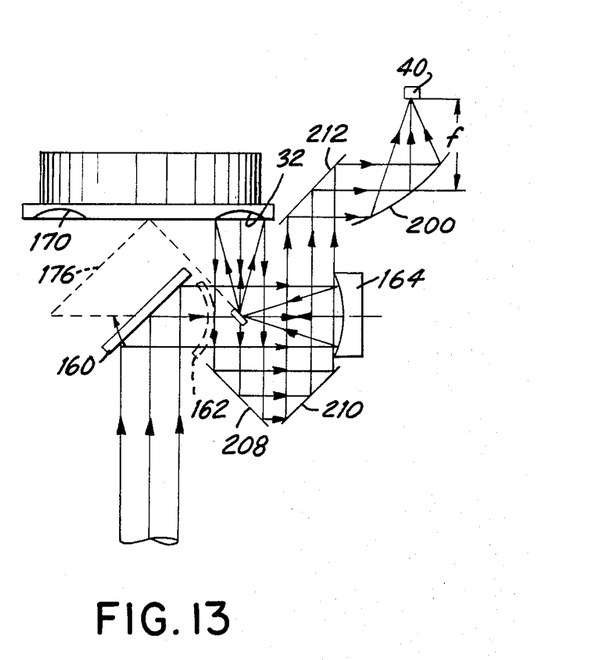
FIG. 13 is an elevation view of an alternative embodiment of the scanning apparatus with an off-axis parabolic reflector as the collection optic.

While FIG. 12 correctly illustrates the principle of folding and focussing the collimated image onto the scanning disc axis, the arrangement shown there is not practical under conditions of actual use since the detector array would be disposed directly in the path of the image rays entering the scanning system. One solution to this problem is illustrated in FIG. 13. The image rays from concave reflector 32 are folded by planar reflectors 208, 210, and 212 maintaining collimation. Thereafter the image rays are incident upon a section of parabolic reflector 200 satisfying the conditions previously discussed with reference to FIG. 12.

Although the off-axis parabolic reflector effectively eliminates walk-off, it introduces optical rotation about the orthogonal axis of the linear array. As the concave reflector scans the image in its arc of sweep the correct focal point for off-axis detector positions varies, introducing defocus at points away from the midpoint of the array. This defocus problem could be solved by rotating the detector array about the orthogonal axis during the scan to maintain proper focus, but rotation of the detector array is impractical and would introduce mechanical limitations. The amount of defocus is tolerable for many applications since satisfactory resolution may be maintained over several detector elements. The embodiment in FIG. 13 with the off-axis parabolic reflector achieves a solution to the walk-off problem and forms a collection optic in a single optical surface.

Figure 14:
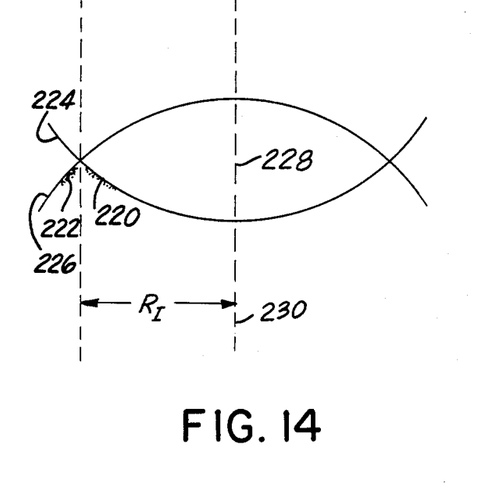
FIG. 14 is a plan view illustrating the construction of a paraboloidal roof mirror.
Figure 15:
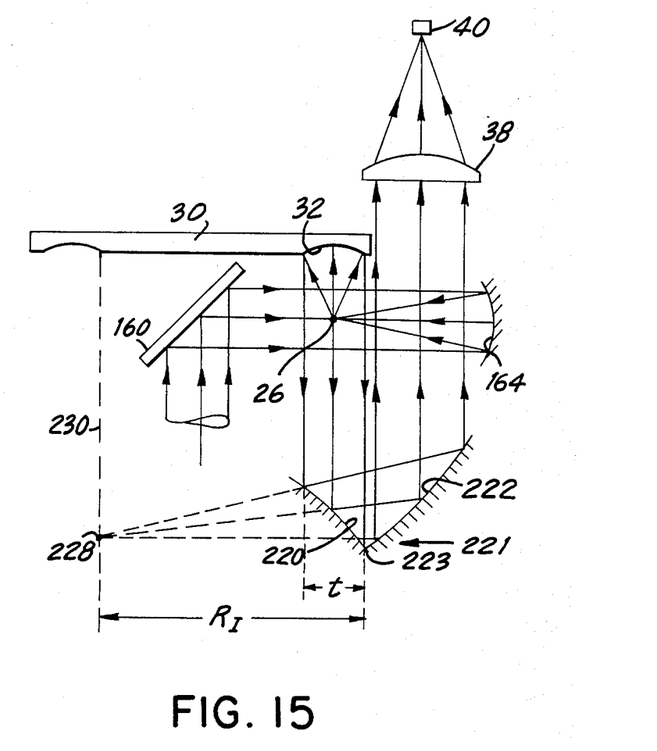
FIG. 15 is an elevation view of an alternative embodiment of the scanning apparatus with a paraboloidal roof mirror.

In FIGS. 14-15 another embodiment of the invention is illustrated wherein the walk-off problem is solved without the defocus introduced by the parabolic reflector. This embodiment involves the use of a paraboloidal roof mirror and provides greater precision where accurate focusing over the entire length of the detector array is critical.

A suitable paraboloidal roof mirror 221 is shown in FIGS. 14-15 including sections 220 and 222 taken from convex and concave parabolic surfaces 224 and 226, respectively. Roof mirrors are described generally in the article, "Image Rotation Devices," D. W. Swift, Optics and Laser Technology, August 1972, at 184-185. The base radii of curvature of the parabolic surfaces 224 and 226 are chosen and aligned such that these surfaces share a common focus 228 and a common axis 230. To eliminate walk-off, $R_I$, the radius of intersection of paraboloids 224 and 226, should equal twice the scanning disc radius $R_D$ (See FIGS. 5 and 10).

The intersection of the convex and concave paraboloids creates a perfect 90 degree roof mirror in both the radial and tangential directions for an infinitesimal area at the point of intersection. In general, the image reflected from a roof mirror will be rotated through an angle equal to twice the angle of roof mirror rotation about an axis perpendicular to the line of intersection of the two roof mirror halves. In the present embodiment the 90 degree roof created by the paraboloidal roof mirro, in effect, rotates about such an axis as a function of the image rotation introduced by the angular position of the scanning disc in the scanning sweep. The image rotation about the axis of the concave reflector which the present embodiment corrects corresponds to the scan angle. In relation to the axis perpendicular to the paraboloidal intersection the rotated image from the concave reflector is incident upon the paraboloidal roof mirror rotated in the opposite direction to the rotation caused by the scan angle. When $R_I$ is equal to twice $R_D$ the resulting angular rotation about the axis perpendicular to the paraboloidal intersection equals one-half the angular rotation of the image about the concave reflector axis. Therefore, for any given scan angle the image incident upon the parabolidal roof mirror is rotated about the axis perpendicular to the paraboloidal intersection in the opposite direction to the image rotation caused by the scanning sweep in an amount equal to one-half the scan angle. Since the paraboloidal roof rotates an image by twice the angle of rotation about the axis of paraboloidal intersection, the image reflected from the paraboloidal roof mirror will be rotated in the opposite direction to the image rotation caused by the scan angle by an amount equal to the scan angle. Therefore, perfect nulling of the image rotation caused by the scanning sweep is achieved. Advantageously, the paraboloidal roof mirror does not introduce defocus and therefore may be used when accurate focusing is critical.

In practice, the paraboloidal roof mirror must be positioned so that the emerging image can be distinguished from the incident image. In other words, the incident image cannot be retroreflected upon itself as it would be if the axis perpendicular to intersection of the paraboloids was positioned coincident with the axis of the incident image beam.

The paraboloidal roof mirror 221 is positioned as shown in FIG. 15. The image rays from concave reflector 32 are incident upon the convex paraboloidal reflector section 220 away from paraboloidal reflectors intersection 223. The lateral displacement t of the paraboloidal roof mirror correspond to the entry pupil required to accommodate the collimated image beam from concave reflector 32. The chief rays are reflected from convex paraboloidal reflector section 220 at an angle approximating, but not equal to, 90 degrees since the image is reflected from the convex paraboloidal reflector section at a height higher than intersection 223. Therefore, the rays reflected from the convex paraboid are incident upon and reflected from concave paraboloidal reflector section 222 at a slightly greater height than the exit pupil from convex parabolodial section 220. The difference in entering and emerging ray heights for paraboloidal roof mirror 221 must be sufficient to provide non-overlapping pupils for paraboloidal reflector sections 220,222. Although the internal reflections of the paraboloidal roof mirror, as positioned, are not precisely at angles of 90 degrees, for $R_I$ equal to twice $R_D$ correction of walk-off is achieved.

Previous discussion has emphasized the position of strip mirror 26 (FIG. 2A) at the focus of the concave reflector 32 so that radiation is reflected from concave reflector 32 in a collimated beam, creating an image effectively located at infinity relative to subsequent optical elements. Alternatively, the strip mirror may be placed at a point other than the focus of the concave reflector to produce an emerging beam which is either convergent or divergent. The convergent beam will be focused at an arcuate locus of points corresponding to the sweeping motion of the scanning disc across the strip mirror.

Figure 16:
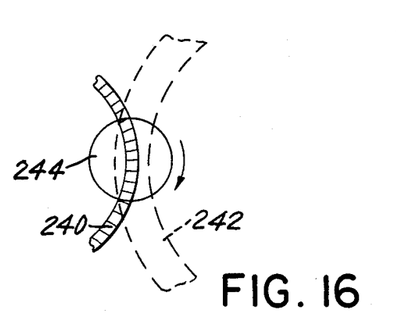
FIG. 16 is a plan view of a detector array arranged as an arc.

A method of detecting an arcuate image without a collection optic is to form a detector array in the shape of the arc of focal points as shown in FIG. 16. The arcuate detector array 240 is dimensioned to equal the direct projection of the strip mirror. Strip mirror image 242 is inverted and tangent to detector array 240 for all points in the scanning sweep and therefore some walk-off will occur at off-axis image points. Because of "walk-off" this embodiment suffers from some inaccuracy but has the advantage of eliminating the need for a collection optic. When no collection optic is used, the preferred contour of the concave disc reflectors is ellipsoidal with the strip mirror placed at the first focus of the ellipsoidal concave reflector and the detector array placed at the second focus. This configuration prevents on-axis aberrations. The detectors are preferably activated in a sequence corresponding to the sweep of the scanning disc.

One advantage of the system according to the invention is that the radiation between the concave reflectors and the collection lens or mirror just prior to the detector is in the form of a collimated beam and therefore the optics in this portion of the system can be folded without any significant deterioration in optical performance. By folding the optics, the scanner can be made more compact and can be arranged to achieve the desired overall configurations.

Figure 6A:
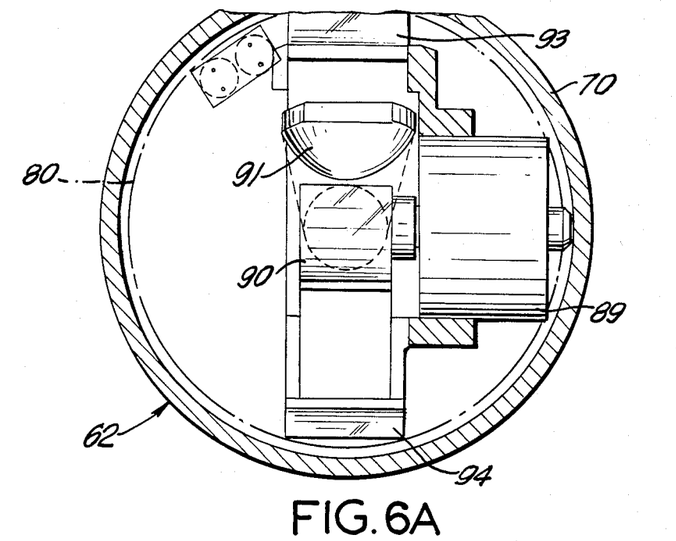
FIGS. 6A and 6B are cross-sectional elevation and end views illustrating an in-line scanner arrangement according to the invention.
Figure 6B:
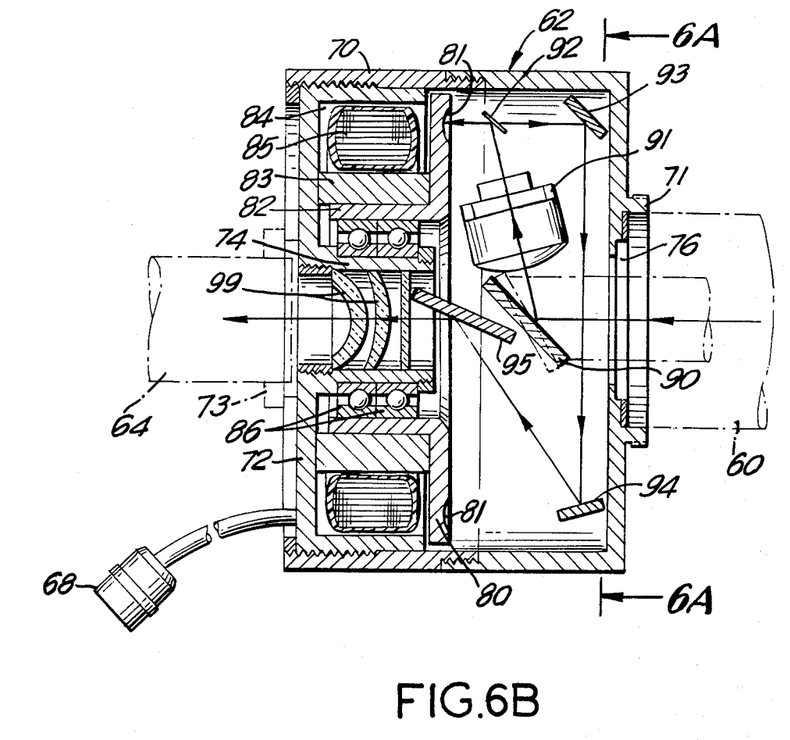
Figure 6C:
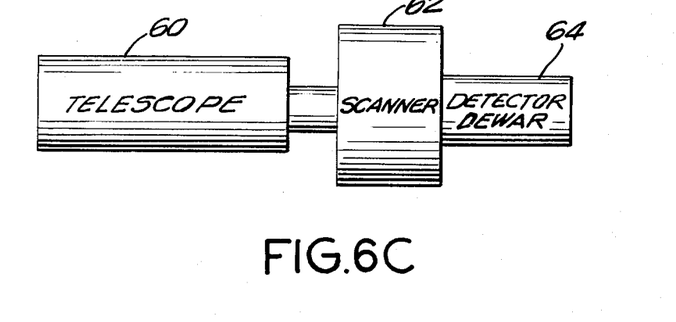
FIG. 6C is a block diagram illustrating the in-line scanner coupled to a telescope and detector.

A preferred embodiment of the invention is illustrated in FIGS. 6a–6c wherein an in-line scanner 62 is shown having an axial alignment with a telescope 60 and an infrared detector/Dewar 64.

The scanner, best seen in FIG. 6a, fits into a cylindrical housing 70 including a threaded telescope mounting flange 71 on one side. A germanium window 76 provides an aperture through the center of the flange suitable for optically coupling the telescope to the scanner. An externally threaded base 72 fits into the open side of housing 70 and includes an inwardly projecting boss 74 having a central opening therein suitable for coupling the scanning optics to detector 64. The detector is mounted by means of a suitable flange 73. Flanges 71 and 73, and the openings through the flanges, are such that the telescope, scanner and detector are all axially aligned.

The scanning disc 80 includes the circular array of concave reflectors 81 and is integral with a cylindrical shaft 82. Shaft 82 is journaled for rotation about boss 74 by means of a duplex pair of ball bearings 86. The scanning disc is driven by a hysteresis synchronous motor built into the housing. The motor includes a stator structure 84 with windings 85 and a permanent magnet rotor structure mounted surrounding cylindrical drive shaft 82. The motor can include a three phase stator winding energized from an external control system via connector 68. Speed sensing signals for controlling motorspeed are also brought out via connector 68 and can be derived either from Hall detectors in the motor or from photoelectric sensors operating off the scanning disc. Any suitable speed control system can be employed such as a phase lock loop comparing the speed sensing signals to a reference clock. Signals required for synchronizing external video systems may also be derived from the scanning disc through photoelectric detectors, and these signals also would be brought out via connector 68.

Framing mirror 90 is located at the exit pupil of telescope 60. The framing mirror is driven by a galvanometer type drive unit 89 which rotates the mirror through about eleven degrees in going from the top to the bottom of the scene being scanned. Suitable drive systems for the framing mirror are available commercially from General Scanning, Inc. The framing mirror is moved in accordance with a saw tooth waveform at a 60 Hertz rate and with a "flyback" time of less than 0.015 seconds so as to be compatible with EIARS-170 video format. The mirror is preferably made of beryllium or other light weight, strong material. Suitable dimensions of the mirror are 1.0 inch by 0.530 inches and 0.050 inches thick.

Imaging lens unit 91 is telecentric and is located as closely as possible to framing mirror 90 and strip mirror 92. The entrance pupil for the imaging lens is located at the center of framing mirror 90 whereas the exit pupil is essentially at infinity to provide the telecentric conditions. A two element lens constructed of germanium is employed with two aspherics. The strip mirror is in the form shown in FIG. 9 including a reflective mirror portion in the center slanted to reflect radiation toward the scanning disk 80. The nominal dimensions for the strip mirror flat reflective surface are 0.02 inches by 0.25 inches.

Scanning disc 80 includes twenty-four concave reflectors 81 each 0.25 inches in diameter. The reflectors have a paraboloidal surface contour and a speed of about F/1.0. The speed of rotation depends on the detector system being used and, in particular, the number of horizontal traces which are scanned simultaneously. With two detector rows the motor speed is about 20,000 RPM whereas with eight rows of detectors the motor speed is reuced to about 5,000 RPM. The distance between reflector centers is 0.29 inches and a distance of 0.04 inches is left between reflectors to provide a horizontal blanking interval and to provide comfortable machine tolerances.

The optical path is shown in FIG. 6b by the arrows going from telescope 60 toward the detector 64. Radiation coming from the telescope is reflected off framing mirror 90, passes through imaging lens 91, and is then reflected off strip mirror 92 toward the array of concave reflectors 81. The radiation emerging from the reflectors is in the form of a collimated beam which is folded in a manner which brings the beam back to the original axis of the telescope so as to emerge through the center of the motor via a collectin lens 99. Mirrors 93–95 are suitably mounted in the housing as shown to achieve the desired path. The collection lens includes two germanium elements with all surfaces being spherical.

In order to maximize the optical transmission within the scanner, all germanium elements are preferably included with a high efficiency dielectric anti-reflection coating, and all reflective surfaces are coated with a gold or multilayer dielectric coating which yields 99 percent or greater reflectance in the region of the spectrum for which the scanner is designed.

The optical system design parameters for the preferred embodiment illustrated in FIG. 6 are as follows:

| System Data | |
|---|---|
| Field of View | 28.0° |
| Equivalent Focal Length | 1 inch |
| Entrance Pupil Diameter | .5 inch |
| F/Number | 2.0 |
| Transmission | 70% |
| Scan Distortion | 3.5% |
| Imaging Lens Data | |
| Field of View | 28.0° |
| Equivalent Focal Length | .5 inch |

-continued

| | |
|---|---|
| Entrance Pupil Diameter | .5 inch |
| F/Number | 1.0 |
| Image Size | .25 × .188 inch |
| Scan Disc Reflector Data | |
| Field of View | 2.5° |
| Entrance Pupil Diameter | .25 inch |
| Radius of Curvature | .5 inch |
| Focal Length | .25 inch |
| Aperture | .25 inch |
| F/Number | 1.0 |
| Image Size | .010 × .010 inch |
| Collection Lens Data | |
| Field of View | 2.5° |
| Entrance Pupil Diameter | .25 inch |
| Aperture | .50 × .25 inch |
| Focal Length | .5 inch |
| F/Number | 2.0 |
| Image Size | .020 × 0.20 inch |

Figure 7:
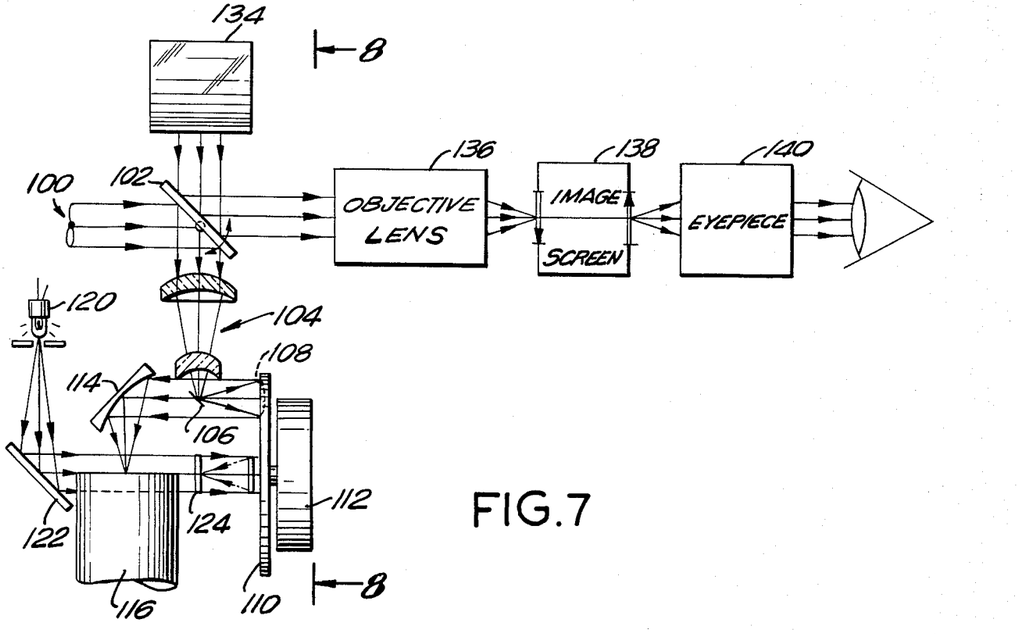
FIGS. 7 and 8 are elevation and side views illustrating an embodiment wherein the scanner operates simultaneously in the "read" and "write" modes.
Figure 8:
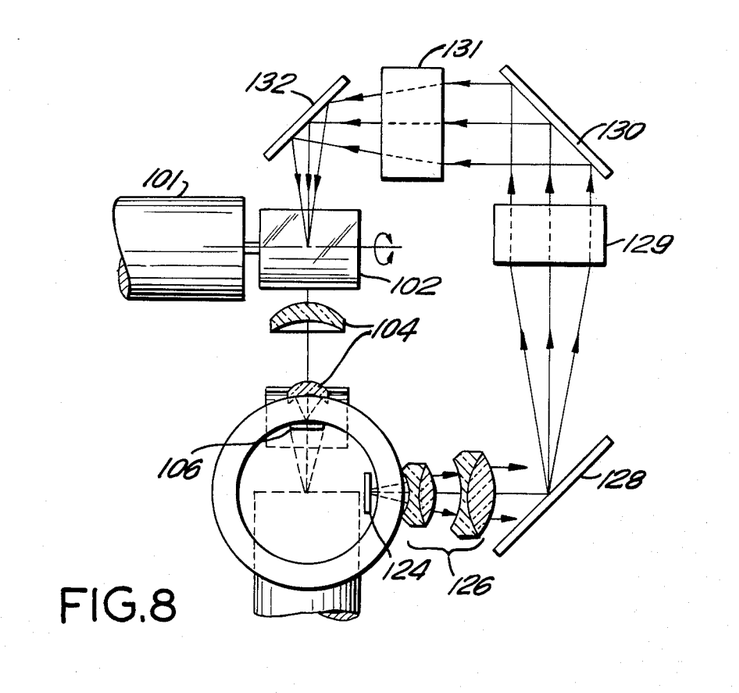

FIG. 7 and FIG. 8 illustrate another embodiment of the invention including both "read" and "write" modes. This system scans an infrared scene using an infrared detector. The emerging electrical signal is amplified and then used to control a visible light source such as a light emitting diode (LED). Visible light is then passed through the scanning system to construct a corresponding visible video image. The same framing mirror and array of concave reflectors is used in both the "read" and "write" modes to minimize components in the system and to maintain exact synchronism between the two operating modes.

Incoming infrared radiation 100 is reflected off framing mirror 102 and passes through imaging lens 104 to form a linear trace on strip mirror 106. The strip mirror reflects the infrared radiation toward the concave reflectors 108 on scanning disc 110. Radiation emerges from the reflectors as a collimated beam which travels past the strip mirror to an off-axis parabolic collection reflector 114 which focusses the collimated beam on an infrared detector in a Dewar flack 116.

The framing mirror is driven by a galvanometric drive unit 101 which provides the vertical scan and scanning disc 110 is driven by a motor 112 to provide the horizontal scan. The system thus far described operates essentially the same as that previously described in connection with FIGS. 1-4.

The signal from the infrared detector 116 is amplified (by means of an amplifier not shown) and then used to control intensity of a visible light source such as a light emitting diode (LED) 120. The visible light passes through the scanner in the reverse direction to paint or "write" the same scene in visible light. Light from LED 120 passes through a pinhole to a collection reflector 122 which forms a collimated beam directed toward the circular array of reflectors on disc 110. As shown in the drawing, the beam is directed toward a different portion of the disc than that being used for the infrared scanning, e.g., a portion displaced therefrom by 90 degrees.

The light beam is focussed on to a strip mirror 124 which in turn reflects the light into a collimating lens 126. The collimated beam is reflected off mirrors 128-132 in succession to the reverse side framing mirror 102.

The light is then reflected off the reverse side of the framing mirror and passes through an objective lens 136 to create a visible light image on an image screen 138 which is preferable of the image intensifier type if a low energy level LED is used as the light source. Alternatively, light source 120 could be a high intensity laser in which case image intensification would normally not be required. The image can be viewed through an eyepiece 140. Preferably, the optics in forming the image reverses the image top to bottom so it appears with the same orientation as the original scene.

With this arrangement the scanning system according to the invention is used to scan an infrared scene and to reconstruct the scene in a visible light image, thereby providing image amplification as well as shifting of the spectrum from infrared to visible light.

Although air is the most common optical medium through which the image forming radiation passes, particularly between the various optical elements, other transmissive media, e.g., glass, can be used with minor adjustments.

While a few illustrative embodiments have been described in detail to illustrate the concepts of the invention, it should be obvious that there are numerous variations that could be employed without departing from the scope of the invention. The scope of the invention is more particularly defined in the appended claims.

I claim:

1. A raster scanning system for providing a video type image including parallel linear scan image elements, the improvement including:
    a rotating scanning disc including a circular array of concave reflectors on a plane surface thereof;
    an imaging means configured to coincide with the scanning sweep of the concave reflectors and separated from said concave reflectors by a distance equal to the focal length of said concave reflectors; and
    radiation emitting means positioned to emit radiation at a controlled intensity toward said array of concave reflectors to form a linear scanning image redirected from said imaging means.

2. The system according to claim 1 further including means for forming radiation from said radiation emitting means into a collimated beam directed toward said array of concave reflectors.

3. The system to claim 1 wherein said radiation emitting means emits radiation in the visible light spectrum.

4. A scanning system for scanning a scene in an orthogonal pattern comprising:
    a framing mirror to provide linear traces of a scan of the scene in one direction;
    means for forming an image of said linear trace at a locus of foci lying upon a spherical image surface;
    a rotating scanning disc having a circular array of concave reflectors on a plane surface thereof;
    a convex strip mirror configured as a section of a cone taken normal to the cone axis to coincide with said locus of foci and to redirect said trace to said concave reflectors, said strip mirror being disposed at a distance from said concave reflectors by a distance equal to the focal length of said concave reflectors; and
    detection means for detecting the intensity of radiation reflected from said strip mirror by said concave reflectors.

5. The new scanning system according to claim 4 wherein said means for forming an image of said linear trace further comprise a primary imaging mirror having a spherical contour.

6. The scanning system according to claim 4 wherein radiation reflected from said strip mirror by said concave reflectors emerges from said concave reflectors in a collimated beam and is focused upon said detection means by a collection optic.

7. The scanning system according to claim 6 further comprising image rotation means disposed in the optical path between said concave reflectors and said collection optic.

8. The scanning system according to claim 7 wherein said image rotation means further comprise a paraboloidal roof-type mirror.

9. In a scanning system wherein a scene is scanned in an orthogonal pattern including linear scanning traces in one of the orthogonal directions focused at a locus of foci, the improvement comprising:
   a rotating scanning disc including a circular array of concave reflectors on a plane surface thereof;
   an image means configured and dimensioned to coincide with the locus of foci and on which the linear scanning trace appears such that said image means redirects the focused radiation of the scanning trace to the concave reflectors; and
   radiation detecting means positioned to detect the intensity of radiation reflected from said image means by said concave reflectors.

10. The system according to claim 9 wherein said concave reflectors are parabolic.

11. The system according to claim 9 wherein said concave reflectors are spherical.

12. A system according to claim 9 wherein said radiation detection means includes multiple detectors located to successively detect radiation from the same point of the scene being scanned.

13. The system according to claim 9 wherein said radiation detection means includes a plurality of detectors located to simultaneously detect radiation from different linear traces of the scene being scanned.

14. The system according to claim 9 wherein said radiation detection means is an infrared detector.

15. The system according to claim 9 wherein said radiation detection means is an ultraviolet radiation detector.

16. The system according to claim 9 wherein said radiation detection means detects visible light.

17. The system according to claim 9 wherein said radiation detection means including a plurality of detectors each capable of detecting radiation in a different spectral region.

18. The system according to claim 9 further comprising means for suppressing potential spurious radiation.

19. The system according to claim 18 wherein said means for suppressing potential spurious radiation further comprise reflective surfaces oriented to reflect radiation from the detector back to the detector.

20. The system according to claim 9 further comprising means defining a collection aperture corresponding to the scanning sweep of said rotating scanning disc.

21. The system according to claim 20 further comprising mesns for shading a portion of said collection aperture.

22. The system according to claim 9 wherein said linear scanning trace on said image means is separated from said concave reflectors by a distance equal to the focal length of said concave reflectors.

23. The system according to claim 22 wherein said imaging means is a strip mirror.

24. The system according to claim 23 wherein said strip mirror is a section of a toroidal surface.

25. The system according to claim 23 wherein said strip mirror is a section of a conical surface.

26. The system according to claim 23 wherein said strip mirror is a section of a spherical surface.

27. The system according to claim 22 wherein said concave reflectors are shaped so that radiant energy emerging therefrom is in a collimated beam and wherein said system further includes means for focussing said collimated beam on said radiation detecting means.

28. The system according to claim 27 wherein said means for focussing is a collector lens.

29. The system according to claim 27 wherein said means for focussing is a parabolic reflector.

30. The system according to claim 29 wherein said parabolic reflector rotates said collimated beam and effectively focuses said collimated beam on the axis of said scanning disc.

31. The system according to claim 27 further comprising image rotation means disposed in the optical path of said collimated beam between said concave reflectors and said focussing means.

32. The system according to claim 31 wherein said image rotation means further comprises a paraboloidal roof-type reflector.

33. A scanning system for providing an orthogonal scan of a scene including:
   a framing mirror for providing a low speed vertical scan of the scene;
   means for forming an image of said vertical scan at a locus of foci;
   a rotating scanning disc including a circular array of concave reflectors on a planar surface thereof;
   a strip mirror configured and dimensioned to coincide with the locus of foci and separated from said concave reflectors by a distance equal to the focal length of said concave reflectors for reflecting radiation from said locus of foci toward said circular array of concave reflectors; and
   radiation detection means positioned to detect the intensity of radiation reflected by said strip mirror and at least one of said concave reflectors.

34. The system according to claim 33 wherein said strip mirror is a section of a conical surface.

35. The system according to claim 33 wherein said strip mirror is a section of a toroidal surface.

36. The system according to claim 33 wherein said strip mirror is a section of a spherical surface.

37. The system according to claim 33 wherein said strip mirror is a ribbon of reflective material.

38. The system according to claim 33 wherein said strip mirror is a reflective strip on a transparent substrate.

39. The system according to claim 33 further comprising means for shading said radiation detection means.

40. The system according to claim 33 further including radiation emitting means positioned to emit radiation at a controlled intensity toward said array of concave reflectors to form a linear scanning image.

41. The system according to claim 33 further including means for suppressing potential spurious radiation.

42. The system according to claim 41 wherein said means for suppressing potential spurious radiation further include reflective surfaces oriented to reflect radiation from the detector back to the detector.

43. The system according to claim 33 further comprising means defining a collection aperture corresponding to the scanning sweep of said rotating scanning disc.

44. The system according to claim 43 further comprising means for shading a portion of said collection aperture.

45. The system according to claim 33 wherein said means for forming an image of said vertical scan further include a telecentric imaging means located along the optical path between said framing mirror and said strip mirror so that a linear trace of said scene appears on said strip mirror in accordance with the position of the framing mirror.

46. The system according to claim 45 wherein said telecentric imaging means is a lens.

47. The system according to claim 45 wherein said strip mirror is a section of a conical surface.

48. The system according to claim 45 wherein said strip mirror is a section of toroidal surface.

49. The system according to claims 45 wherein said strip mirror is a section of a spherical surface.

50. The system according to claim 45 wherein said telecentric imaging means is a concave imaging mirror.

51. The system according to claim 50 further including a concentric meniscus lens in the optical path prior to said concave imaging mirror.

52. The system according to claim 50 wherein said concave imaging mirror has a spherical contour.

53. A scanning system according to claim 33 wherein radiation emerges from said concave reflectors in a collimated beam and wherein said system further includes a collector means for focussing said collimated beam on said radiation detection means.

54. The system according to claim 53 wherein said collector means is a lens.

55. The system in accordance with claim 53 further including at least one reflective surface between said array of concave reflectors and said collector means to fold the optical path.

56. A system according to claim 53 wherein the optical path toward said framing mirror is in line with the path to said radiation detection means.

57. The system according to claim 53 wherein said collector means is a parabolic reflector.

58. The system according to claim 57 wherein said parabolic reflector rotates said collimated beam and effectively focuses said collimated beam on the axis of said scanning disc.

59. The system according to claim 53 further including image rotation means disposed in the optical path of said collimated beam between said concave reflectors and said focusing means.

60. The system according to claim 59 wherein said image rotation means is a paraboloidal roof-type reflector.

* * * * *